US007062846B2

(12) United States Patent
Armstrong et al.

(10) Patent No.: US 7,062,846 B2
(45) Date of Patent: Jun. 20, 2006

(54) TOOL FOR ENGAGING ELECTRICAL HARDWARE DEVICES

(75) Inventors: Adam I. Armstrong, Durham, NC (US); Alexander V. Verrigni, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 378 days.

(21) Appl. No.: 10/408,190

(22) Filed: Apr. 4, 2003

(65) Prior Publication Data

US 2004/0194304 A1 Oct. 7, 2004

(51) Int. Cl.
*B23P 19/00* (2006.01)

(52) U.S. Cl. ............................ 29/764; 29/741; 29/758; 29/761; 29/854; 29/258; 29/266; 29/278

(58) Field of Classification Search .................. 29/764, 29/741, 758, 258, 266, 278, 761, 854; 439/358, 439/326, 327
See application file for complete search history.

(56) References Cited

U.S. PATENT DOCUMENTS 4,194,805 A 3/1980 Ayer et al. .................. 339/107
4,202,088 A 5/1980 Hansen ........................ 29/280
4,723,361 A 2/1988 Carlson et al. ............... 29/764
4,879,806 A 11/1989 Feng ........................... 29/741
5,479,669 A 1/1996 Chen ............................ 7/107
5,566,445 A 10/1996 Piao ............................ 29/741
6,249,960 B1 6/2001 Faesel ......................... 29/762

FOREIGN PATENT DOCUMENTS

GB 2055322 A 7/1979

*Primary Examiner*—A. Dexter Tugbang
*Assistant Examiner*—Tai Van Nguyen

(74) *Attorney, Agent, or Firm*—Patrick J. Daugherty; Driggs, Hogg & Fry Co., LPA

(57) ABSTRACT

An apparatus is provided for engaging electrical hardware devices. The apparatus has a handle; a planar body; a planar engagement bar projecting normal from the body; a pair of arms, one arm formed at each of two ends of the bar; and each arm further bending and terminating in a bottom hook portion, the bottom hooks aligned in a common plane parallel to and spaced a gap distance from the bar and generally normal to the planar body. The hook spacing dimension is about equal to or slightly greater than an outer dimension of an electrical hardware device workpiece body but less than an outer dimension of a rectilinear lip element projecting from the hardware device workpiece. The gap distance is about equal to or slightly greater than a thickness dimension of the rectilinear lip element.

6 Claims, 2 Drawing Sheets

TOOL FOR ENGAGING ELECTRICAL HARDWARE DEVICES

FIELD OF THE INVENTION

The present invention is related to hand tools for the manipulation of small electronic hardware devices in electronic hardware systems. More particularly, the present invention is related to the locking and unlocking of mechanical electronic hardware connectors within microelectronic computer systems.

BACKGROUND OF THE INVENTION

In the computer industry, hardware connectors are widely used to effect electrical connections between different electronic devices. Typical mechanical connection devices include socket connectors which receive rigid electrical contact structures, such as memory cards; large gauge wire socket and pin connectors, such as the four pin socket connectors used to connect CD-ROM drives to sound card circuit boards; and Zero insertion force connectors, also known as "ZIF" connectors, for use with relatively smaller gauged flexible ribbon wired cables. The present invention focuses primarily on the problems posed in the operation of a typical ZIF connector in engaging flexible ribbon cables; however, it is to be understood that the present invention may also be utilized with any type of electrical hardware connection utilizing mechanical elements.

The end of the typical flexible ribbon cable has a plurality of thin flat planar electrical pads aligned in a common plane. The typical ZIF connector has a locking element that clamps down upon the ribbon cable pads and compels them against electrical contacts to complete an electrical connection within the ZIF connector body. Due to the fragile, thin and flexible nature of the ribbon connector pads, the ZIF connector must provide the connective forces necessary to retain the cable within the ZIF connector, and this is provided for through mechanical means by the ZIF locking element.

The typical ZIF connector has a long rectangular shape with a top locking element. It is important that the locking bar be aligned in a horizontal position when "open" and, therefore, parallel to the ZIF connector body, in order to properly and evenly insert the flexible ribbon cable pads into the ZIF connector body. It is also important to evenly and carefully lower the locking element against the ribbon pads, in order to form good electrical connections across the entire length of the flexible ribbon connector without damaging either the ribbon or the ZIF connector.

Problems frequently arise during the connection and disconnection of the ribbon connectors from the ZIF connections. The ZIF locking element typically has one engagement tab at either end for raising and lowering the locking element. Prior art methods typically call for the use of fingernails or a screwdriver to engage the tabs. Since these methods only engage one tab at a time, it is difficult if not impossible to evenly raise the locking element. It is even more difficult to evenly lower and engage the ribbon pads with the locking element. Thus, prior art methods frequently result in uneven opening or closure of the ZIF connector. Damage is frequently caused to either or both of the flexible cable and ZIF, and incomplete electrical connections may also occur where the locking element is not fully seated in its closed position and some of the ribbon pads are not compelled into engagement with the ZIF electrical contacts. Furthermore, since the ZIF connector is frequently located on a crowded printed circuit board, surrounded by fragile electrical devices and connections, access to the ZIF connection may only be directly above and, therefore, in a vertical plane. The use of a screwdriver or fingernails may be proscribed through lack of operational room, or surrounding devices may be damaged.

What is needed is a tool to firmly and safely engage small electronic hardware devices and mechanically manipulate the devices within the very crowded and tight tolerance conditions typically found on a computer circuit board, thereby avoiding damage to surrounding computer elements and otherwise operating in a very narrow workspace. What is needed is a tool to firmly and safely engage the ZIF connector locking element, configured to raise and lower the locking element while maintaining a parallel alignment to the ZIF connector body during opening and electrical engaging closure of the locking element upon a flexible cable connection.

SUMMARY OF THE INVENTION

A tool and method for using the tool is provided for engaging electrical hardware devices. The tool has a handle; a planar body; a planar engagement bar projecting normal from the body; a pair of arms, one arm formed at each of two ends of the bar; and each arm further bending and terminating in a bottom hook portion, the bottom hooks aligned in a common plane parallel to and spaced a gap distance from the bar and generally normal to the planar body. The hook spacing dimension is about equal to or slightly greater than an outer dimension of an electrical hardware device workpiece body but less than an outer dimension of a rectilinear lip element projecting from the hardware device workpiece. The gap distance is about equal to or slightly greater than a thickness dimension of the rectilinear lip element.

DESCRIPTION OF THE PREFERRED EMBODIMENTS

Figure 1:
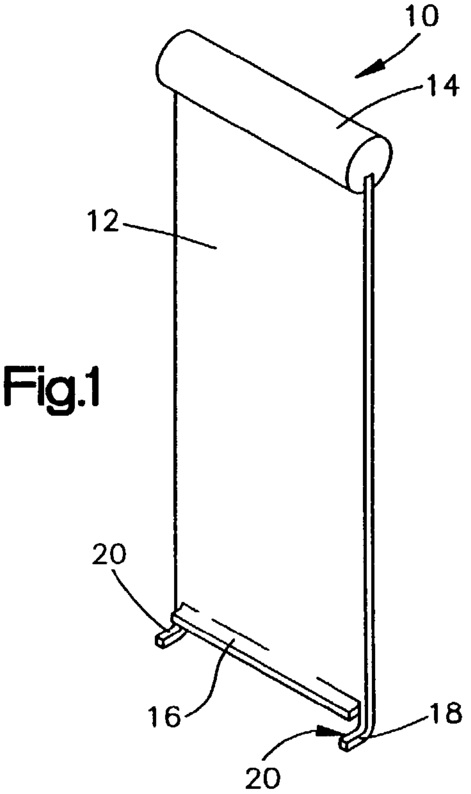
FIG. 1 is a side perspective view of an embodiment of the present invention.
Figure 2:
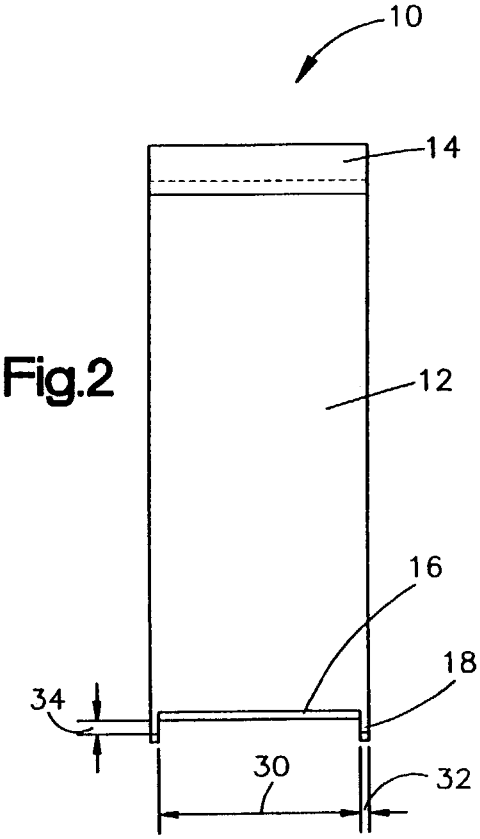
FIG. 2 is a front plan view of the invention of FIG. 1.
Figure 3:
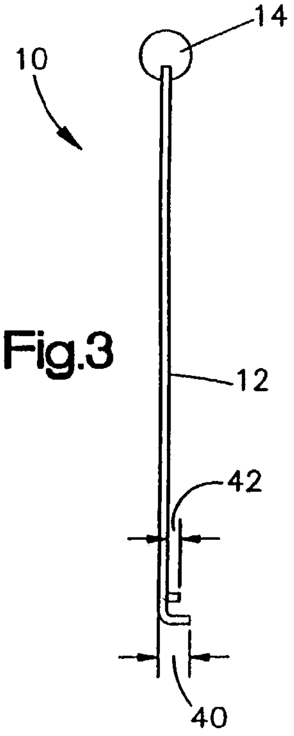
FIG. 3 is a side plan view of the invention of FIG. 1.
Figure 4:
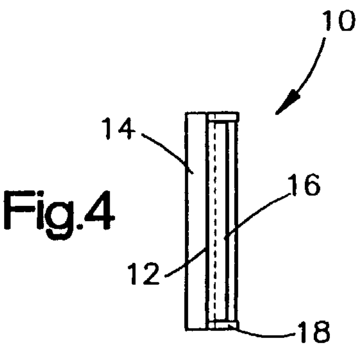
FIG. 4 is a bottom plan view of the invention of FIG. 1.

The present invention provides for a tool and a method for engaging electronic hardware devices and connectors. Although the present invention may be used with many different types of devices, each embodiment must physically conform to a target connected device and, accordingly, each tool embodiment is preferably formed to fit a specific connected device. FIGS. 1–5 illustrate one embodiment of the present invention, a ZIF tool 10 configured to cooperatively engage a 52147-1310 series Molex Vertical ZIF Connector Z. The Molex ZIF Connector Z has a rectangular body shape about 29.1 millimeters wide by about 3.6 millimeters deep. The connector Z has a top rectilinear locking element L, which slides vertically upward into an "open" position to receive a ribbon cable, and slides downward to lock the ribbon cable into the device and effect an electrical connection thereto. With the locking element L in the unlocked open position, the overall height of the 52147-1310 series Molex Vertical ZIF Connector Z is about 7.6 millimeters.

It is preferred that the tool 10 have a vertical alignment substantially parallel to the plane of travel of the ZIF locking element L, and remain in this alignment during the opening and closing of the locking element L. This alignment enables the tool 10 to engage and operate the ZIF walking element L within tight space requirements, such as upon a crowded circuit board. The tool 10 is configured to engage the locking element L such that the element L retains its alignment parallel to the ZIF connector body B during locking and unlocking operations, ensuring safe manipulation of the locking element L and uniform engagement of flexible ribbing connectors by the ZIF locking element L and body B.

The tool 10 is preferably formed from a metallic alloy, giving the tool strong but light weight characteristics. However, it is readily apparent the tool 10 may be formed from other rigid structural materials, such as thermoplastics. The ZIF tool 10 has a planar body 12. Although other body structures are possible, a planar configuration is preferred in order to provide a narrow vertical profile. A narrow profile enables the tool to be used within tightly spaced areas, and using a planar member provides structural strength to the device. At the top end of the body 12 a cylindrical handle element 14 is formed for gripping by a user of the tool 10. Other handle structures will be readily apparent to one skilled in the art, such as a ribbed cylindrical "screwdriver" type of handle (not shown), and the present invention is not restricted to cylindrical handle structures.

Formed at the bottom end of the tool 10 and aligned generally normal to the planar body 12 is a rectilinear engagement bar 16. At either end of the rectilinear bar 16, engagement arms 18 project from the planar body 12. The arms 18 project beyond the bar 16 parallel to the planar body 12, and then bend and terminate in bottom hook portions 20 parallel to and spaced from the bar 16 and generally normal to the planar body 12.

Figure 5:
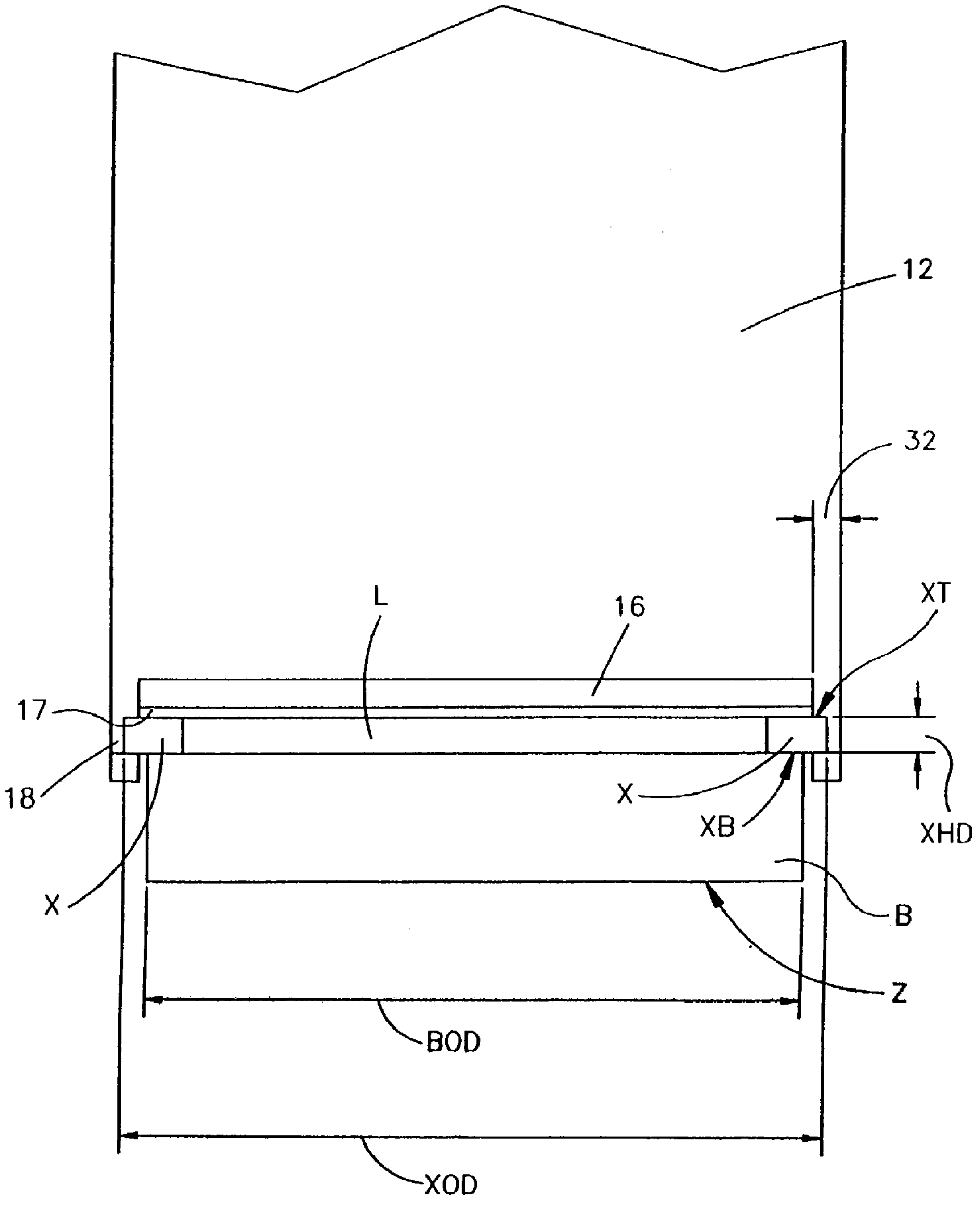
FIG. 5 is a view of the present invention engaging a ZIF connector.

Although the tool 10 may be used with many different types of ZIF connections, the dimensional relationship of the tool engagement bar 16 and arms 18 to the to the ZIF locking engagement bar L is important. Accordingly, it is preferred that each tool is formed to fit a specific ZIF connector. As illustrated in FIG. 5, the ZIF tool 10 is configured to cooperatively engage the ZIF connector Z. The ZIF bar L has a pair of engagement tabs X located at either end. The tool alignment arms 18 are parallel to each other and separated by a distance 30. It is important that the distance 30 is chosen to be greater than the outer dimension BOD of the ZIF connector body B but less than the outer dimension XOD of the ZIF engagement tabs X. This allows the tool arms 18 to freely slide along the outside surfaces of the ZIF body B while the tool arm hook surfaces 20 engage a portion of the locking element tab bottom surface XB. The tool 10 can thereby evenly engage both tabs X and draw the locking element L upward, "unlocking" the ZIF connector Z and enabling the insertion or removal of a ribbon cable (not shown). For the ZIF connector Z, it is preferred that the distance 30 is about 29.1 millimeters, and the width 32 of the arm hook surfaces 20 is about 1.3 millimeters.

To lock the ZIF device Z, the tool bar 16 engages the ZIF locking element L when the tool 10 is compelled downwards. The rectilinear shape of the tool bar 16 causes the locking element L to remain aligned with the bar 16 as the tool 10 is compelled downward and, therefore, if the tool bar 16 is compelled evenly across the top surfaces XT of the locking element tabs X, then the locking element L will be seated completely into and parallel to the ZIF connector body B. The present invention thereby provides for a complete and even engagement of a flexible ribbon cable by the ZIF connector Z. Other structures may be utilized in place of the rectilinear tool bar 16, such as two or more arm elements (not shown) similar to the arms 18; what is important is that at least two points of contact define a linear alignment of interaction with the locking element L, in order to assure correct alignment of the locking element L as it is compelled downward. The rectilinear shape of the tool bar 16 is preferred to easily and quickly assure a common alignment with an engaged locking element L through maximizing the available points of contact with the locking element L.

It is preferred that the tool 10 firmly engage the locking element L between the bar 16 and the arms 18, ensuring that the movement of the locking element L closely corresponds with the upper and downward movement of the tool 10 itself. Accordingly, it is preferred that the gap dimension 34 between the arm hook top surfaces 20 and the engagement bar 16 is about equivalent or slightly larger than the thickness of the locking element L. In the present embodiment of the invention, for a Molex Vertical ZIF model 52147-1310 Connector Z, the distance 34 is about two millimeters.

By providing a vertical alignment of the tool 10 with respect to an engaged ZIF connector Z, the tool 10 may engage the ZIF connector Z within the tight space restrictions common to a typical circuit board (not shown) without coming into contact with or damaging any adjacent circuit components (not shown). Further along these lines, it is preferred that the arms 18 have a length 40 not to exceed about 5 millimeters, with the bar 16 having a length 42 of about 2 mm. Thus, a spacing distance of greater than 5 mm between the ZIF connector Z and any adjacent circuit component will enable use of the present invention embodiment tool 10.

While preferred embodiments of the invention have been described herein, variations in the design may be made, and such variations may be apparent to those skilled in the art of making tools, as well as to those skilled in other arts. The materials identified above are by no means the only materials suitable for the manufacture of the tool, and substitute materials will be readily apparent to one skilled in the art. The scope of the invention, therefore, is only to be limited by the following claims.

What is claimed is:

1. A tool for engaging a vertical ZIF connector, comprising:
- a planar body member having upper and lower ends;
- a handle element formed at the top end of the body;
- a planar engagement bar formed at the bottom end of the body member and having first and second ends, the engagement bar projecting from the body member and aligned generally in a plane normal to the body member, the engagement bar having a length dimension;
- a pair of arms formed at the bottom end of the body member, one arm at each of the first and second ends, the arms projecting from the planar body below the engagement bar and parallel to the planar body; and
- each arm further bending and terminating in a bottom hook portion, the bottom hooks aligned in a common plane parallel to and spaced a gap distance from the bar and generally normal to the planar body, each hook further comprising an inside edge, the hook inside edges defining a hook spacing dimension about equal to the engagement bar length dimension;

wherein the hook spacing dimension is about equal to or slightly greater than an outer dimension of a vertical ZIF connector base but less than an outer dimension of a rectilinear lip element projecting from a ZIF locking member, wherein the ZIF locking member is slidably connected to the ZIF connector base;

and wherein the gap distance is about equal to or slightly greater than a thickness dimension of the rectilinear lip element.

2. The tool of claim 1 wherein the hook spacing dimension is about 29.1 millimeters.

3. The tool of claim 1 wherein the arm hooks have a common width dimension of about 1.3 millimeters.

4. The tool of claim 1 wherein the tool comprises material selected from the group of a metallic alloy and a thermoplastic material.

5. The tool of claim 1 wherein the gap dimension is about 2 millimeters.

6. The tool of claim 1 wherein the hooks extend to an arm length normal to a plane defined by the body member, the arm length less than about 5 millimeters.

* * * * *